March 15, 1932.  F. D. RUGG  1,849,408
RAKE
Filed July 25, 1930
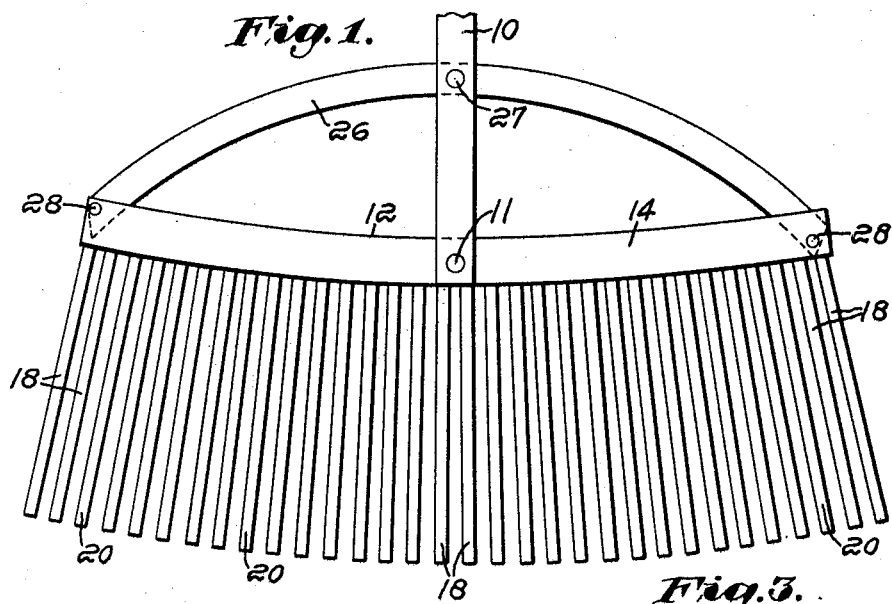
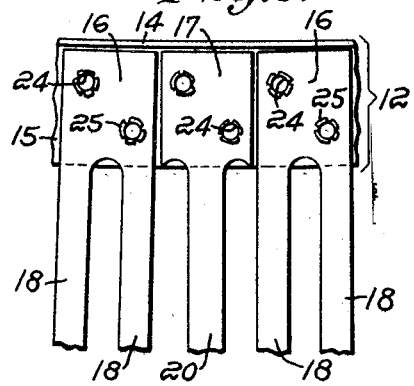
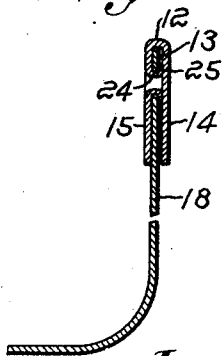
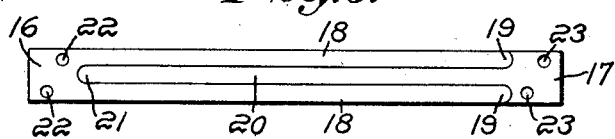
Inventor:
Frank D. Rugg,
by Emery, Booth, Varney & Townsend
Att'ys.

Patented Mar. 15, 1932

1,849,408

UNITED STATES PATENT OFFICE

FRANK D. RUGG, OF GREENFIELD, MASSACHUSETTS

RAKE

Application filed July 25, 1930. Serial No. 470,602.

This invention relates to a novel and improved metallic-toothed lawn rake, and will best be understood by reference to the following description, when taken in connection with the accompanying drawings of one illustrative embodiment thereof, while its scope will be pointed out more particularly in the appended claims.

In the drawings:

Fig. 1 is an elevation of a rake embodying the invention, a portion of the handle being broken away to save space;

Fig. 2 is an elevation of a portion of the rake as viewed from the opposite side to that shown in Fig. 1;

Fig. 3 is an elevation of a portion of the rake at an enlarged scale, prior to bending one of the flanges of the tooth-supporting bar down upon the plates on which the teeth are formed;

Fig. 4 is a sectional view at an enlarged scale on line 4—4 of Fig. 2; and

Fig. 5 is an elevation of two of the tooth plates illustrating the manner of dieing them out of a strip of steel.

Referring to the drawings, and to the embodiment of the invention which is illustrated therein, there is shown a rake comprising a handle 10, herein a cylindrical bar of wood, to which there is secured, as by a rivet 11, a transverse bar 12, the latter in the present example presenting a channel 13 (see Fig. 4) between two flanges 14 and 15. As herein shown, the bar is curved rearwardly from its point of attachment to the handle, thereby to cause a divergence of the teeth now to be described.

One convenient way of making the teeth is to pass a continuous strip of flexible steel between a pair of cutting and punching dies, which, by one stroke of the punch press cuts off a piece of appropriate length, and punches it to form two plates 16 and 17, one having a pair of spaced teeth 18, having rounded ends 19, and the other having a single tooth 20, having a rounded end 21. At the same time, two holes 22 are punched in the plate 16, and two holes 23 are punched in the plate 17. Thus the two plates are formed without waste of metal, except for that which is punched out in forming the holes 22 and 23. It is desirable that the two teeth 18 diverge slightly toward their free ends. This is conveniently accomplished in the present case by a die which spreads them apart slightly, immediately following the cutting operation.

The bar 12 is at first an angle-bar,—that is to say, its flanges 14 and 15 are perpendicular to each other (see Fig. 3). The plates 16 and 17 are placed in an alternating series upon the flange 15, and they are conveniently secured to the latter by extruding the flange to present eyelets 24 integral therewith and pushed through the perforations (see Fig. 4), and headed over as at 25 after the fashion of tubular rivets upon the front faces of the plates 16 and 17. The arrangement of these fastening elements is such that when all of the plates have been applied to the bar, there is a comparatively uniform divergence of the teeth, as will be evident from an inspection of Figs. 1 and 2. The final step in the process is to fold the flange 14 downwardly to the position shown in Fig. 4 thus greatly increasing the strength of the rake head, and giving it a neat appearance.

After the rake head has thus been completed, it is secured to the handle 10 by the rivet 11, and appropriate bracing means, herein a curved brace 26 is secured to the handle, as by a rivet 27, and to the bar 12, as by rivets 28. As herein shown, these latter rivets are passed through the openings presented by two of the eyelets, or tubular rivets 24. As the eyelets are arranged in staggered formation, the rivet 28 at one end of the bar 12 will naturally pass through an eyelet of the upper row, while the rivet at the other end will pass through an eyelet of the lower row (see Fig. 1).

In practice, the free ends of the teeth are bent in the manner shown at the lower portion of Fig. 4, with the extremities of the teeth perpendicular to the plane of the principal portions of the teeth, this formation being best suited to the work for which the rake is intended,—namely: as a lawn rake. The rake is well adapted for mass production, and possesses great strength, while being light and easily manageable. The mode of attaching the teeth to the bar is such that the teeth possess great flexibility, and can be made of tempered stock, without danger of breaking at their points of attachment to the supporting bar, as there is no need of any welding operation.

Having thus described one embodiment of the invention, but without limiting myself thereto, what I claim and desire by Letters Patent to secure is:

1. In a rake, the combination of a handle, a bar extending transversely of and attached to said handle, a transverse series of plates presenting forwardly directed teeth, said plates being provided with perforations, said bar presenting two forwardly-directed flanges between which said plates are received, and fastening means extending from one of said flanges through said perforations toward the other flange and securing said plates to said bar.

2. In a rake, the combination of a handle, a channel bar extending transversely of and attached to said handle, said channel-bar presenting two forwardly-directed flanges, and a transverse series of plates received between said flanges and secured to one of said flanges, some of said plates presenting each a single tooth and some presenting each two teeth.

3. In a rake, the combination of a handle, a channel bar extending transversely of and secured to said handle, said channel bar having a web along and closing its rear edge and upper and lower, forwardly directed, spaced flanges forming a slot open all along the front edge of said bar, a transverse series of flat, flexible teeth extending rearwardly into said slot and disposed flatwise with relation to said flanges, and fastening means securing said teeth in place.

4. In a rake, the combination of a handle, a channel bar extending transversely of and secured to said handle, said channel bar having a web along and closing its rear edge and upper and lower, forwardly directed, spaced flanges forming a slot open all along the front edge of said bar, a transverse series of flat, flexible teeth extending rearwardly into said slot and disposed flatwise with relation to said flanges, and fastening means extending through said teeth and securing the latter in place.

5. In a rake, the combination of a handle, a channel bar extending transversely of and secured to said handle, said channel bar having a web along and closing its rear edge and upper and lower forwardly directed, spaced flanges forming a slot open all along the front edge of said bar, and a transverse series of flat, flexible teeth extending rearwardly into said slot and disposed flatwise with relation to said flanges, said teeth being provided with perforations, and one of said flanges being provided with projections extending through said perforations toward the other of said flanges and securing said teeth in place.

6. In a rake, the combination of a handle, a channel bar extending transversely of and secured to said handle, said channel bar having a web along and closing its rear edge and upper and lower, forwardly directed, spaced flanges forming a slot open all along the front edge of said bar, and a transverse series of flat, flexible teeth extending rearwardly into said slot and disposed flatwise with relation to said flanges, said teeth being provided with perforations, and one of said flanges being provided with projections extending through said perforations toward the other of said flanges and headed over onto said teeth adjacent to the inner face of the other flange.

In testimony whereof, I have signed my name to this specification.

FRANK D. RUGG.